US009225268B2

(12) United States Patent
Nagatsuka

(10) Patent No.: US 9,225,268 B2
(45) Date of Patent: Dec. 29, 2015

(54) ELECTRIC VEHICLE DRIVE SYSTEM

(75) Inventor: Yoshio Nagatsuka, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 57 days.

(21) Appl. No.: 14/364,231

(22) PCT Filed: Dec. 12, 2011

(86) PCT No.: PCT/JP2011/078695
§ 371 (c)(1),
(2), (4) Date: Jul. 1, 2014

(87) PCT Pub. No.: WO2013/088497
PCT Pub. Date: Jun. 20, 2013

(65) Prior Publication Data
US 2014/0368134 A1    Dec. 18, 2014

(51) Int. Cl.
*H02P 27/04* (2006.01)
*H02P 3/12* (2006.01)
(Continued)

(52) U.S. Cl.
CPC ... *H02P 3/12* (2013.01); *B60L 3/00* (2013.01); *B60L 7/06* (2013.01); *B60L 9/22* (2013.01); *H02P 6/00* (2013.01); *B60L 2200/26* (2013.01)

(58) Field of Classification Search
CPC ..................................... B60L 1/00; H02P 3/12
USPC ......... 318/139, 362, 374, 375, 376, 380, 800, 318/801; 180/165.29, 165.31; 188/153 R; 307/9.1, 66; 105/26.05, 48, 49; 320/116
See application file for complete search history.

(56) References Cited

U.S. PATENT DOCUMENTS 5,465,202 A    11/1995   Ibori et al.
6,538,412 B1 *  3/2003   Klose et al. .................. 318/801
(Continued)

FOREIGN PATENT DOCUMENTS

JP    4-207986 A    7/1992
JP    5-252755 A    9/1993
(Continued)

OTHER PUBLICATIONS

International Search Report (PCT/ISA/210) mailed on Mar. 6, 2012, by the Japanese Patent Office as the International Searching Authority for International Application No. PCT/JP2011/078695.
(Continued)

*Primary Examiner* — Antony M Paul
(74) *Attorney, Agent, or Firm* — Buchanan Ingersoll & Rooney PC

(57) ABSTRACT

An electric vehicle drive system includes an electric-vehicle power conversion device, and an earth ground switch that is a triple-pole single-throw switch having a switching contact unit. The electric-vehicle power conversion device includes a smoothing circuit unit that includes a filter capacitor that receives and stores therein power supplied from an overhead wire, an inverter that converts a DC voltage of the smoothing circuit unit into an AC voltage to drive an electric motor, and a brake chopper circuit that consumes excess power, which cannot be returned toward the overhead wire. A brake resistance in the brake chopper circuit is connected to the switching contact unit. When the switching contact unit is closed, the brake resistance is electrically connected between the positive electrode and the negative electrode of the filter capacitor.

8 Claims, 6 Drawing Sheets

(51) Int. Cl.
  *B60L 3/00*  (2006.01)
  *B60L 7/06*  (2006.01)
  *B60L 9/22*  (2006.01)
  *H02P 6/00*  (2006.01)

(56) References Cited

U.S. PATENT DOCUMENTS

| | | | | |
|---|---|---|---|---|
| 8,453,814 | B2 * | 6/2013 | Gambach et al. | 191/3 |
| 8,615,339 | B2 * | 12/2013 | Higuchi et al. | 701/22 |
| 8,615,341 | B2 * | 12/2013 | Kitanaka | 701/22 |
| 9,018,792 | B2 * | 4/2015 | Still | 307/9.1 |
| 2009/0224706 | A1 * | 9/2009 | Jobard | 318/380 |
| 2010/0318248 | A1 | 12/2010 | Higuchi et al. | |

FOREIGN PATENT DOCUMENTS

| | | |
|---|---|---|
| JP | 8-19101 A | 1/1996 |
| JP | 8-331870 A | 12/1996 |
| JP | 9-037562 A | 2/1997 |
| JP | 2004-056956 A | 2/2004 |
| WO | WO 2007/122671 A1 | 11/2007 |

OTHER PUBLICATIONS

Written Opinion (PCT/ISA/237) mailed on Mar. 6, 2012, by the Japanese Patent Office as the International Searching Authority for International Application No. PCT/JP2011/078695.

* cited by examiner

ELECTRIC VEHICLE DRIVE SYSTEM

FIELD

The present invention relates to an electric vehicle drive system.

BACKGROUND

An electric-vehicle power conversion device operates upon reception of a power supply from an overhead wire. Because an overhead-wire voltage is very high (for example, DC 1500 volts), even when the power supply from the overhead wire is blocked, a large amount of electric charge is still stored in a filter capacitor and the like within a main circuit. Therefore, there remains risk of an electric shock.

For example, an electric-vehicle control device described in Patent Literature 1 mentioned below includes a series circuit that is constituted by a plurality of contactors and a resistor, and that is connected between a converter and inverters. At the time of inspection and maintenance of an electric vehicle, the contactors are switched on by a contactor control unit for a predetermined time so as to discharge electric charge in filter capacitors through the resistor. The control is performed as described above with consideration given to operators so as not to receive an electric shock even when they touch a conductive part at the time of inspection, maintenance, and the like of an electric vehicle.

CITATION LIST

Patent Literature

Patent Literature 1: Japanese Patent Application Laid-open No. H08-019101

SUMMARY

Technical Problem

However, according to the conventional technique mentioned above, a logic circuit is necessary for controlling a plurality of contactors connected in series to a discharging resistor, and also an additional power source is necessary for controlling the logic circuit. Therefore, in order to reliably discharge electric charge in filter capacitors at the time of inspection, maintenance, and the like of an electric vehicle, various improvements are needed to the circuit configuration and the system configuration. Accordingly, there is a problem of an increase in both circuit size and circuit cost.

The present invention has been achieved to solve the above problems, and an object of the present invention is to provide an electric vehicle drive system that can simply and reliably discharge electric charge in a filter capacitor while suppressing an increase in both circuit size and circuit cost.

Solution to Problem

The present invention is directed to an electric vehicle drive system that achieves the object. The electric vehicle drive system includes an electric-vehicle power conversion device that converts DC power or AC power supplied from an overhead wire into desired AC power to drive an electric motor as a load, a first breaker that blocks an electric current flowing between the overhead wire and the electric-vehicle power conversion device, and a grounding switch that grounds the first breaker. The electric-vehicle power conversion device includes a main circuit unit and a second breaker, where the main circuit unit includes at least a smoothing circuit unit that contains a filter capacitor that receives and stores therein power supplied from the overhead wire, and an inverter that converts a DC voltage from the smoothing circuit unit into an AC voltage to drive an electric motor as a load, and where the second breaker blocks a power supply path between the first breaker and the inverter. The grounding switch is configured as a single-throw switch that includes three or more pole switching contacts. A predetermined resistor that is one of circuit elements that constitute the main circuit unit is connected to a switching contact of the grounding switch such that when the switching contact of the grounding switch is closed, the predetermined resistor is electrically connected between a positive electrode and a negative electrode of the filter capacitor.

Advantageous Effects of Invention

According to the present invention, it is possible to discharge electric charge in a filter capacitor simply and reliably while suppressing an increase in both circuit size and circuit cost.

DESCRIPTION OF EMBODIMENTS

Exemplary embodiments of an electric vehicle drive system according to the present invention will be explained below in detail with reference to the accompanying drawings. The present invention is not limited to the following embodiments.

First Embodiment

Figure 1:
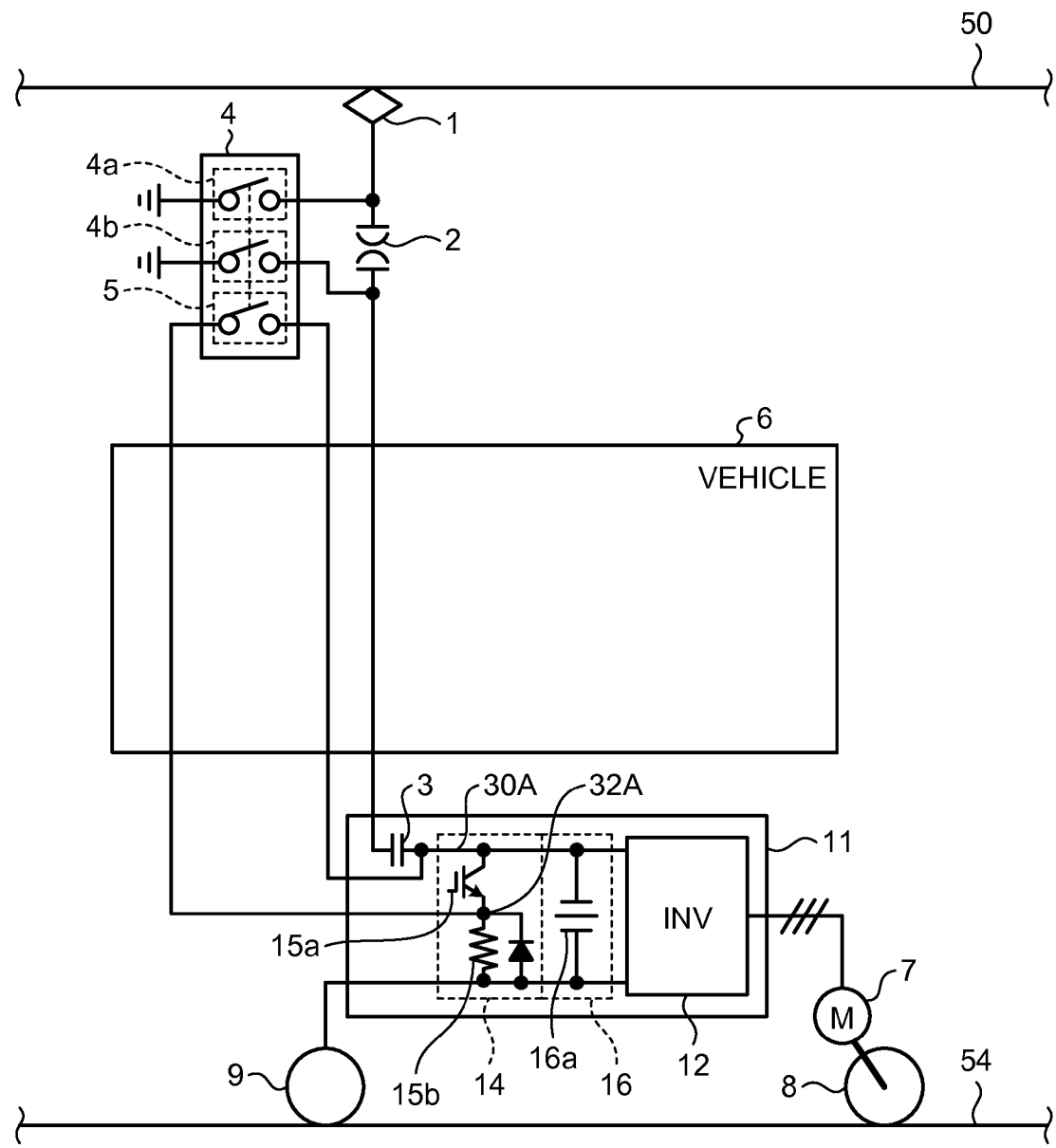
FIG. 1 depicts a configuration of main parts of an electric vehicle drive system according to a first embodiment.

FIG. 1 depicts a configuration of main parts of an electric vehicle drive system according to a first embodiment of the present invention. As shown in FIG. 1, the electric vehicle drive system according to the first embodiment is configured to include a pantograph 1, a high speed breaker (hereinafter, "HB") 2 that serves as a first breaker, an earth ground switch (hereinafter, "EGS") 4 that serves as a grounding switch, an electric-vehicle power conversion device 11, and an electric motor 7. The electric-vehicle power conversion device 11 is configured to include a line breaker (hereinafter, "LB") 3 that serves as a second breaker provided within the electric-vehicle power conversion device 11, a smoothing circuit unit 16 that includes a filter capacitor 16a that receives and stores therein DC power supplied from an overhead wire 50 through the pantograph 1, the HB 2, and the LB 3, an inverter (hereinafter, "INV") 12 that converts a DC voltage of the smoothing circuit unit 16 into an AC voltage to drive the electric motor 7 as a load, and a brake chopper (hereinafter, "BCH") circuit 14 that consumes excess power, which cannot be returned toward the overhead wire 50, when the electric motor 7 operates as a power generator. The smoothing circuit unit 16, the INV 12, the BCH circuit 14, and the like constitute a main circuit unit of the electric-vehicle power conversion device 11.

As shown in FIG. 1, for example, the electric-vehicle power conversion device 11 is installed under the floor of a vehicle 6, and the HB 2 and the EGS 4 are installed on the top of the vehicle 6. Outfitting wires arranged within the vehicle 6 are used for electrical connections between these units.

In FIG. 1, one end of the electric-vehicle power conversion device 11 is connected to the overhead wire 50 through the LB 3, the HB 2, and the pantograph 1, and the other end of the electric-vehicle power conversion device 11 is connected through a wheel 9 to a rail 54 that has the same potential as the earth. DC power supplied from the overhead wire 50 is stored in the filter capacitor 16*a*, which is used as operating power for the INV 12.

Based on a control signal (a signal for controlling a switching element (not shown) on the PWM) that is output from a control unit (not shown), the INV 12 generates desired AC power (an AC voltage) to drive the electric motor 7. The electric motor 7 is coupled with a wheel 8 to transmit a driving force to the wheel 8.

The HB 2 is a switch that blocks an electric current flowing between the overhead wire 50 and the electric-vehicle power conversion device 11. The EGS 4 is a manually-controlled switch that is configured as a triple-pole single-throw switch including switching contact units 4*a*, 4*b*, and 5. Among the switching contact units 4*a*, 4*b*, and 5, the switching contact units 4*a* and 4*b* have been conventionally used. On the other hand, the switching contact unit 5 is provided in order to solve the problems of the present invention.

One end of the switching contact unit 4*a* is connected to one end of the HB 2 (the connection end on the side of the pantograph 1), and the other end of the switching contact unit 4*a* is grounded. One end of the switching contact unit 4*b* is connected to the other end of the HB 2 (the connection end on the side of the electric-vehicle power conversion device 11), and the other end of the switching contact unit 4*b* is grounded. On the other hand, one end of the switching contact unit 5 is connected to a positive DC busbar 30A (or to an end having the same potential as the positive DC busbar 30A) in the electric-vehicle power conversion device 11. The other end of the switching contact unit 5 is connected to a connection end 32A between a switching element 15*a* and a brake resistance 15*b* in the BCH circuit 14.

Next, an operation of relevant parts of the electric vehicle drive system according to the first embodiment is explained with reference to FIG. 1.

At the time of inspection, maintenance, and the like of an electric vehicle, the HB 2 and the LB 3 are opened, and the pantograph 1 is disconnected from the overhead wire 50. After these operations or controls, the EGS 4 is manually controlled to close each contact. Through the manual control on the EGS 4, both ends of the HB 2 are grounded and therefore are at the earth potential. A conventional EGS does not include the switching contact unit 5, and accordingly an operation for making both ends of the HB 2 at the ground potential is performed to achieve the object.

On the other hand, in the electric vehicle drive system according to the first embodiment, the positive DC busbar 30A and the connection end 32A between the switching element 15*a* and the brake resistance 15*b* are electrically connected therebetween by the switching contact unit 5. With this operation, the positive electrode and the negative electrode of the filter capacitor 16*a* are electrically connected through the brake resistance 15*b*, thereby forming a discharge circuit that discharges electric charge stored in the filter capacitor 16*a*. The electric charge stored in the filter capacitor 16*a* is discharged according to the discharge curve that follows the time constant determined by the product of the capacitance of the filter capacitor 16*a* and the resistance value of the brake resistance 15*b*.

In a conventional discharge control, as described in Patent Literature 1 mentioned above, an additional discharge-controlling circuit is configured, and also a particular control unit is established to execute the discharge control. Therefore, in the conventional method, an additional discharge-controlling circuit and an additional control unit are needed, which increases both circuit size and circuit cost.

On the other hand, in the electric vehicle drive system according to the first embodiment, a particular control circuit and a particular control unit for the discharge control are unnecessary. The main points of the electric vehicle drive system according to the first embodiment can be achieved by configuring an EGS as a triple-pole single-throw switch instead of a conventional double-pole single-throw switch, and by electrically connecting the contact of the switching contact unit 5, additionally provided to the EGS, to the BCH circuit 14 through an outfitting wire. The BCH circuit 14 is a circuit unit that is provided in most electric-vehicle power conversion devices 11.

As described above, in the electric vehicle drive system according to the first embodiment, it is possible to simply and reliably discharge electric charge in the filter capacitor 16*a* while suppressing an increase in both circuit size and circuit cost.

Further, in the electric vehicle drive system according to the first embodiment, electric charge in the filter capacitor 16*a* can be discharged in coordination with the EGS 3. Therefore, it is possible to reduce the burden of operators, without the need for a particular operation for discharging electric charge.

Further, for the most part, the electric vehicle drive system according to the first embodiment is not dependent on the circuit operation. Therefore, effects of improving the reliability of the control for discharging electric charge and helping operators to have a better sense of safety can be obtained.

Figure 2:
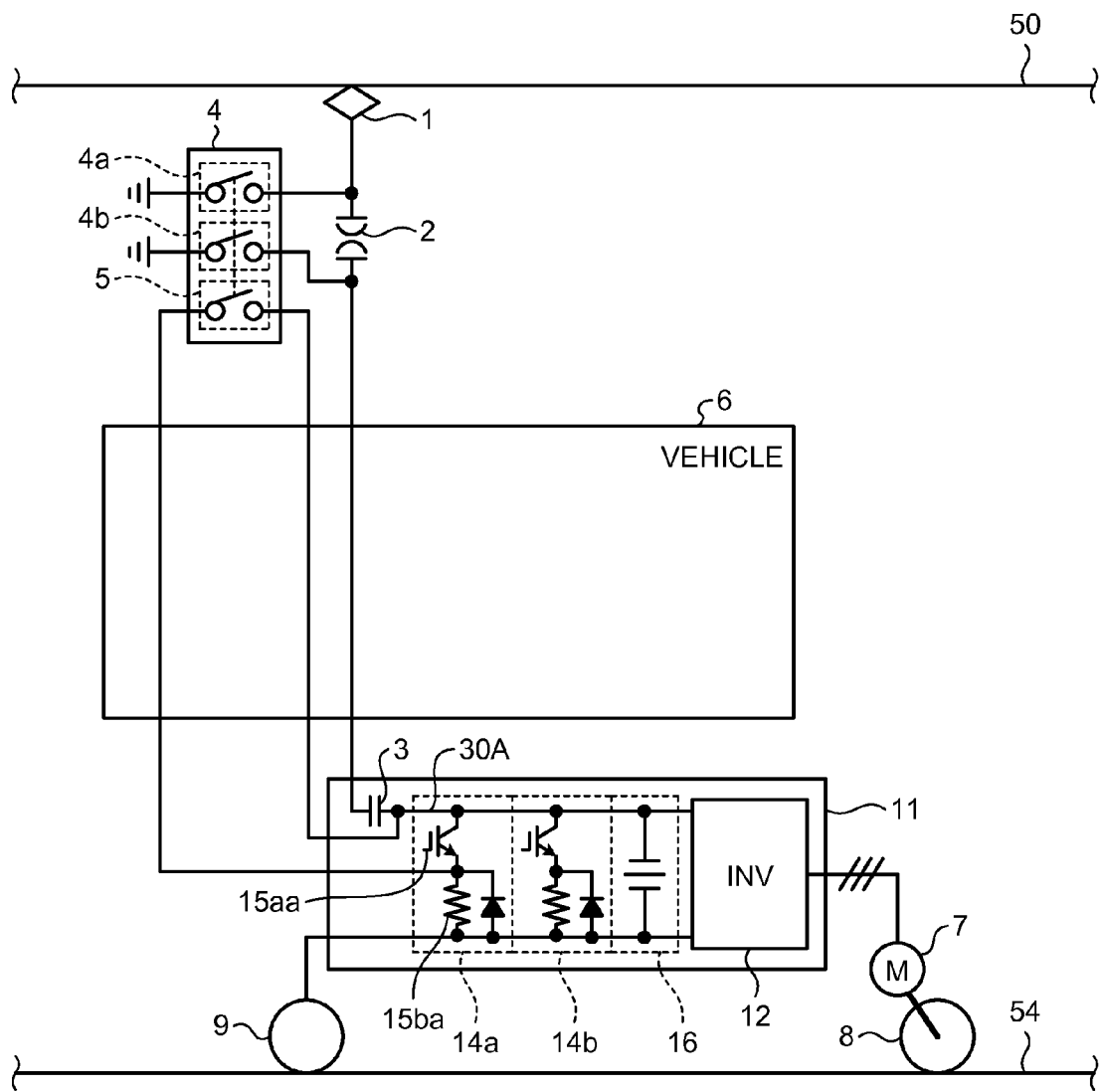
FIG. 2 depicts a configuration of main parts of another electric vehicle drive system according to the first embodiment that is different from the system shown in FIG. 1.

The BCH circuit 14 shown in FIG. 1 can be configured by a plurality of BCH circuits that are connected in parallel. In this case, it suffices that any one of the BCH circuits is selected and connected to the switching contact unit 5. For example, in the configuration as shown in FIG. 2, it suffices that among two BCH circuits 14*a* and 14*b*, the BCH circuit 14*a* is selected, and one end of the switching contact unit 5 is connected to the positive DC busbar 30A to which the BCH circuit 14*a* is connected, while the other end of the switching contact unit 5 is connected to a connection end between a switching element 15*aa* and a brake resistance 15*ba* in the BCH circuit 14*a*.

Second Embodiment

Figure 3:
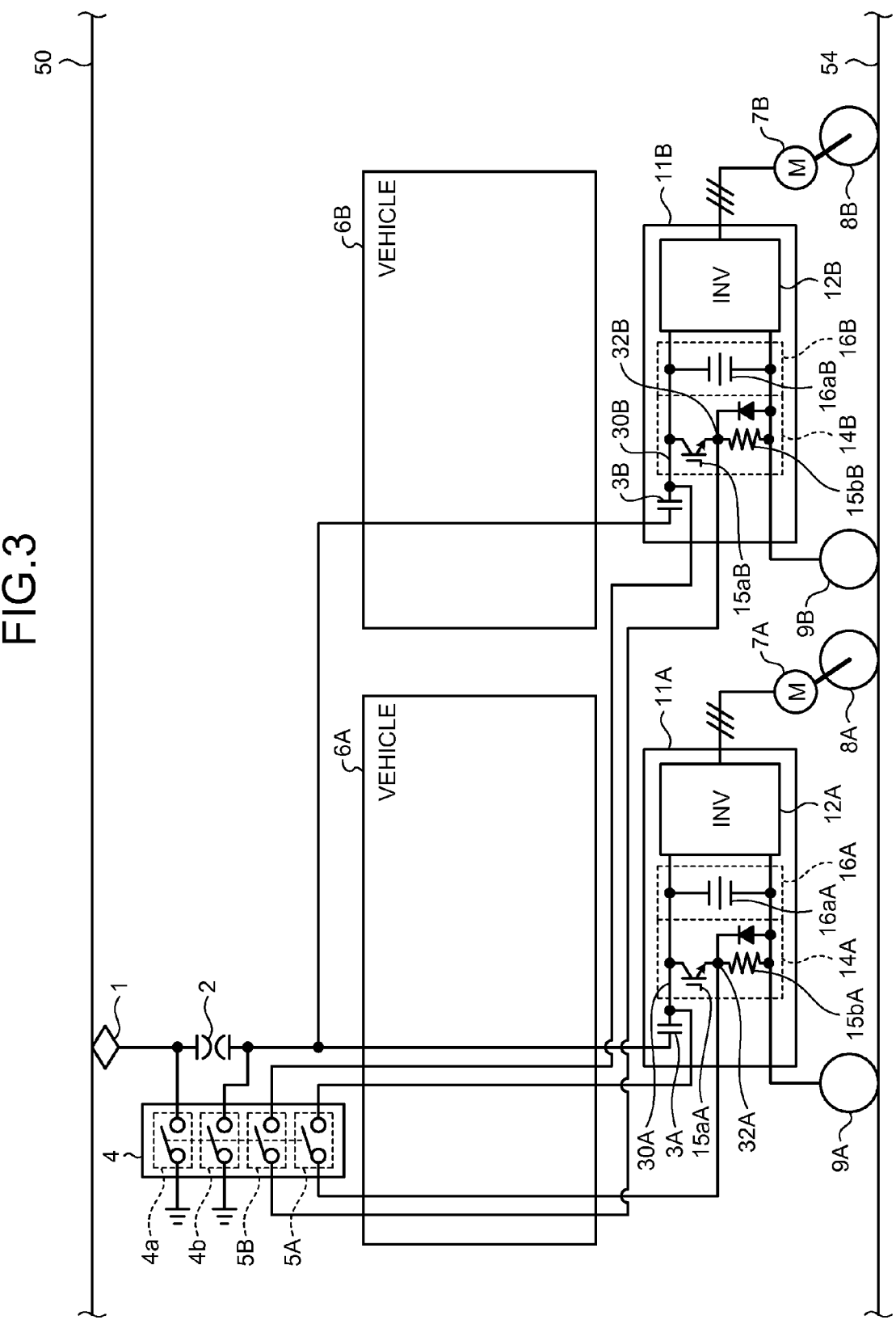
FIG. 3 depicts a configuration of main parts of an electric vehicle drive system according to a second embodiment.

In the first embodiment, there has been described the case as an example, in which an electric-vehicle power conversion device is installed in a vehicle that is equipped with a pantograph. However, in a second embodiment, a case where an electric-vehicle power conversion device is installed in a vehicle that is not equipped with a pantograph is explained with reference to FIG. 3. FIG. 3 depicts a configuration of main parts of an electric vehicle drive system according to the second embodiment.

FIG. 3 depicts a vehicle 6A that is equipped with the pantograph 1 and a vehicle 6B that is not equipped with the pantograph 1. An electric-vehicle power conversion device 11A is installed in the vehicle 6A. An electric-vehicle power conversion device 11B is installed in the vehicle 6B. The individual configurations of the electric-vehicle power conversion devices 11A and 11B, and the configuration of their connections to the overhead wire 50 are identical to those described in the first embodiment. Constituent elements related to the vehicle 6A are denoted by reference signs with a suffix "A". Constituent elements related to the vehicle 6B are denoted by reference signs with a suffix "B".

Meanwhile, in the second embodiment, the EGS 4 is configured as a quadruple-pole single-throw switch that includes the switching contact units 4a and 4b and switching contact units 5A and 5B. That is, in the EGS 4 in the second embodiment, the switching contact unit 5B is added to the EGS 4 in the first embodiment.

In FIG. 3, the switching contact unit 5A corresponds to the switching contact unit 5 in FIG. 1, and the connecting destinations of the switching contact unit 5A are identical to those in the case in FIG. 1. Specifically, one end of the switching contact unit 5A is connected to the positive DC busbar 30A (or to an end having the same potential as the positive DC busbar 30A) in the electric-vehicle power conversion device 11A. The other end of the switching contact unit 5A is connected to the connection end 32A between a switching element 15aA and a brake resistance 15bA in a BCH circuit 14A. On the other hand, one end of the switching contact unit 5B is connected to a positive DC busbar 30B (or to an end having the same potential as the positive DC busbar 30B) in the electric-vehicle power conversion device 11B. The other end of the switching contact unit 5B is connected to a connection end 32B between a switching element 15aB and a brake resistance 15bB in a BCH circuit 14B.

With the above connections, when the EGS 4 is manually controlled, each contact of the switching contact units 4a and 4b and each contact of the switching contact units 5A and 5B are simultaneously closed. When the contact of the switching contact unit 5A is closed, the positive DC busbar 30A and the connection end 32A are electrically connected therebetween. With this operation, the positive electrode and the negative electrode of a filter capacitor 16aA are electrically connected through the brake resistance 15bA. Therefore, electric charge stored in the filter capacitor 16aA is immediately discharged. When the contact of the switching contact unit 5B is closed, the positive DC busbar 30B and the connection end 32B are electrically connected therebetween. With this operation, the positive electrode and the negative electrode of a filter capacitor 16aB are electrically connected through the brake resistance 15bB. Therefore, electric charge stored in the filter capacitor 16aB is immediately discharged.

As described above, a particular control circuit for the discharge control is unnecessary also for the electric vehicle drive system according to the second embodiment. The purpose of the electric vehicle drive system according to the second embodiment can be achieved by configuring an EGS as at least a quadruple-pole single-throw switch instead of a conventional double-pole single-throw switch, and by electrically connecting the contacts of the switching contact units 5A and 5B, additionally provided to the EGS, respectively to the BCH circuits 14A and 14B through outfitting wires.

As described above, in the electric vehicle drive system according to the second embodiment, two switching contact units are additionally provided to an EGS provided on a vehicle that is equipped with a pantograph, such that the contact of one of the two switching contact units and a BCH circuit in an electric-vehicle power conversion device installed in a vehicle that is not equipped with a pantograph are electrically connected therebetween. Therefore, even when a vehicle that is not equipped with a pantograph, but has an electric-vehicle power conversion device installed therein, and a vehicle that is equipped with a pantograph and has an electric-vehicle power conversion device installed therein are mixed together, it is possible to obtain effects identical to those described in the first embodiment.

Third Embodiment

Figure 4:
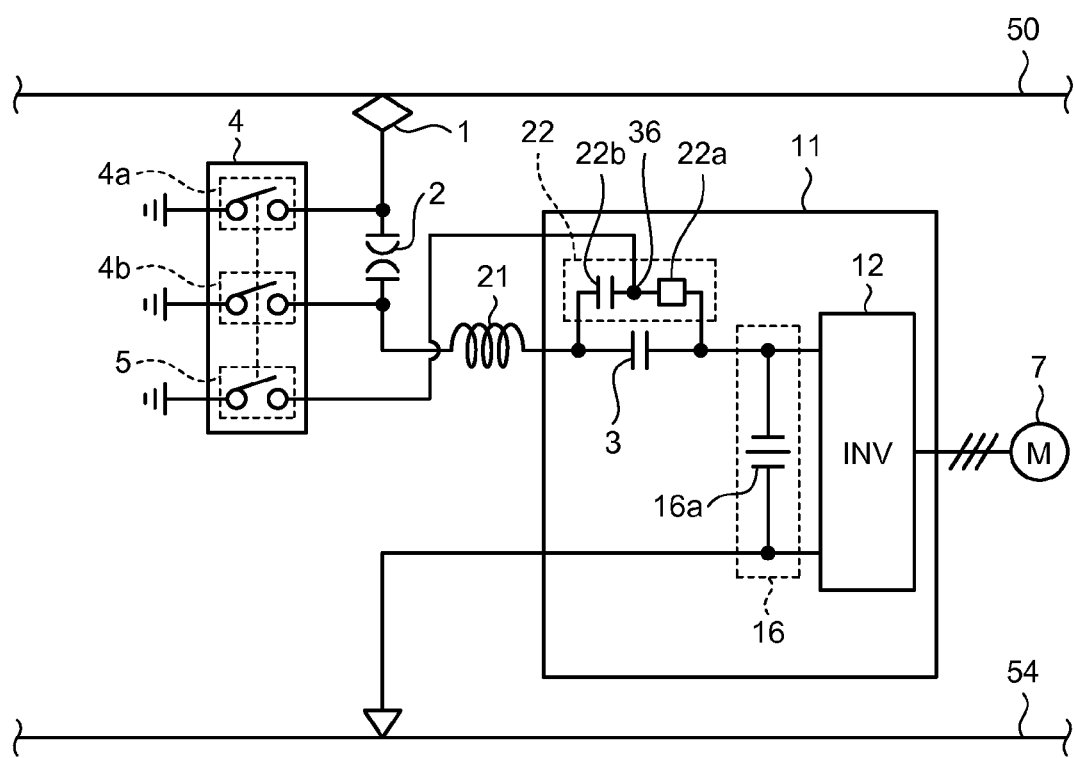
FIG. 4 depicts a configuration of main parts of an electric vehicle drive system according to a third embodiment.

In the first embodiment, there has been explained the case where the switching contact unit, additionally provided to the EGS, and the BCH circuit in the electric-vehicle power conversion device are electrically connected therebetween. However, in a third embodiment, a case where a charging circuit is used as an example of an alternative to the BCH circuit is explained with reference to FIG. 4. FIG. 4 depicts a configuration of main parts of an electric vehicle drive system according to the third embodiment. In FIG. 4, constituent elements same or equivalent to those shown in FIG. 1 are denoted by like reference signs and redundant explanations thereof will be omitted.

In the third embodiment, as shown in FIG. 4, a series circuit between a reactor 21 and a charging circuit 22 is connected in parallel to the LB 3, and is also connected in series between the HB 2 and the INV 12. The charging circuit 22 is a circuit that controls charging of the filter capacitor 16a, and includes a charging resistance 22a and a contactor 22b that disconnects the charging circuit 22 from the circuit. Because operations of the charging circuit 22 are publicly known, explanations of the operations will be omitted.

In FIG. 4, the EGS 4 according to the third embodiment is configured as a triple-pole single-throw switch that includes the switching contact units 4a, 4b, and 5, similarly to the first embodiment. One end of the switching contact unit 5 is connected to a connection end 36 between the charging resistance 22a and the contactor 22b in the charging circuit 22. The other end of the switching contact unit 5 is grounded at the earth potential.

With the above connections, when the EGS 4 is manually controlled to close the contact of the switching contact unit 5, the connection end 36 between the charging resistance 22a and the contactor 22b is grounded at the earth potential. At this time, the positive electrode and the negative electrode of the filter capacitor 16a are electrically connected through the charging resistance 22a and the rail 54, and electric charge stored in the filter capacitor 16a is immediately discharged.

As described above, a particular control circuit for the discharge control is unnecessary also for the electric vehicle drive system according to the third embodiment. The purpose of the electric vehicle drive system according to the third embodiment can be achieved by configuring an EGS as at least a triple-pole single-throw switch instead of a conventional double-pole single-throw switch, by grounding one end of the switching contact unit 5 additionally provided to the EGS, and by electrically connecting the other end of the switching contact unit 5 to the charging resistance 22a through an outfitting wire.

As described above, in the electric vehicle drive system according to the third embodiment, one switching contact unit is additionally provided to an EGS provided on a vehicle that is equipped with a pantograph, such that one end of the switching contact unit is grounded, while the other end is electrically connected to a charging resistance included in a charging circuit within an electric-vehicle power conversion device. Therefore, it is possible to obtain effects identical to those in the case using a BCH circuit that is explained in the first embodiment.

In the third embodiment, there has been explained the case as an example, in which the switching contact unit, additionally provided to the EGS, and the charging circuit in the electric-vehicle power conversion device installed in a vehicle that is equipped with a pantograph are electrically connected therebetween. However, similarly to the second embodiment, it is needless to mention that the present invention can be also applied to a case where the electric-vehicle power conversion device is installed in a vehicle that is not equipped with a pantograph.

Fourth Embodiment

Figure 5:
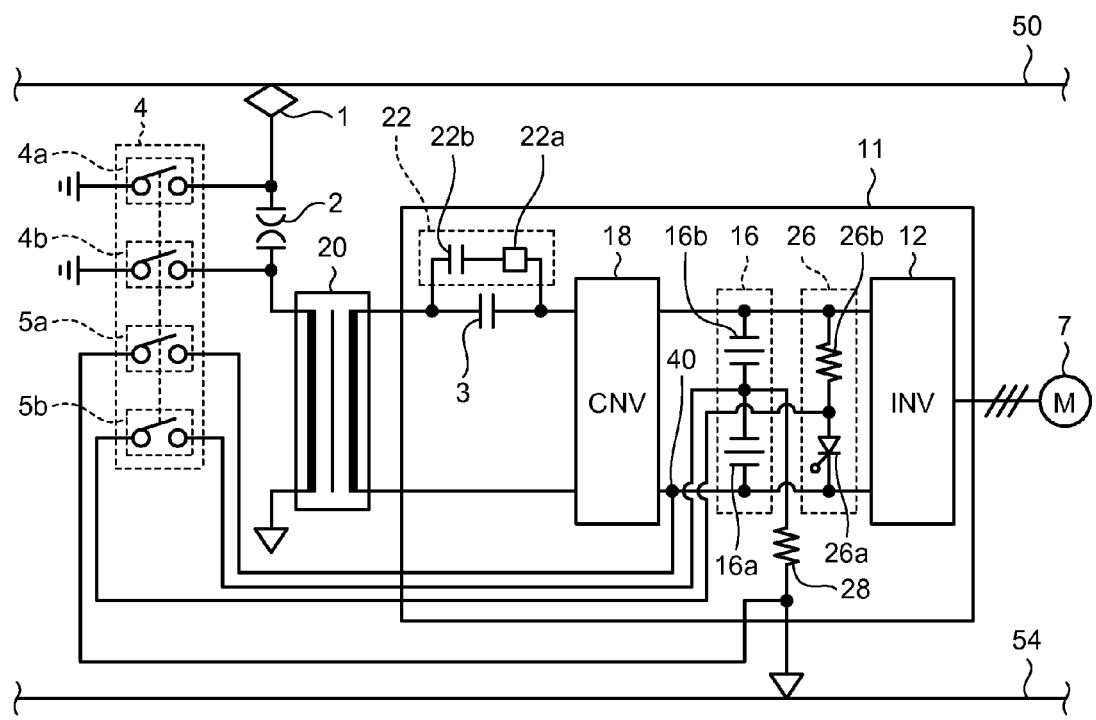
FIG. 5 depicts a configuration of main parts of an electric vehicle drive system according to a fourth embodiment.

In the first to third embodiments, the case where the electric vehicle is a DC electric vehicle has been explained. However, in a fourth embodiment, a case where the electric vehicle is an AC electric vehicle is explained with reference to FIG. 5. FIG. 5 depicts a configuration of main parts of an electric vehicle drive system according to the fourth embodiment. In FIG. 5, constituent elements same or equivalent to those shown in FIG. 1 are denoted by like reference signs and redundant explanations thereof will be omitted.

In an electric vehicle drive system that operates upon reception of AC power, a transformer 20 is provided on the input side of the electric-vehicle power conversion device 11 as shown in FIG. 5, and an AC voltage is applied to the electric-vehicle power conversion device 11. Therefore, in the electric-vehicle power conversion device 11, a converter (hereinafter, "CNV") 18, which converts an AC voltage, reduced by the transformer 20, into a DC voltage, is provided on the input side of the INV 12. In the smoothing circuit unit 16 shown in FIG. 5, a low-side filter capacitor 16a and a high-side filter capacitor 16b are connected in series to be connected between DC busbars.

In a case of the AC electric vehicle, as shown in FIG. 5, it is general that the midpoint of the filter capacitors 16a and 16b that are connected in series is grounded through a grounding resistance 28, and also an overvoltage suppression circuit 26 in which an overvoltage suppression thyristor 26a and an overvoltage suppression resistance 26b are connected in series is provided between the smoothing circuit unit 16 and the INV 12. Because operations of the overvoltage suppression circuit 26 are publicly known, explanations of the operations will be omitted.

In FIG. 5, the EGS 4 according to the fourth embodiment is configured as a quadruple-pole single-throw switch that includes switching contact units 4a, 4b, 5a, and 5b. The connections of the switching contact units 4a and 4b are identical to those described in the first to third embodiments. On the other hand, one end of the switching contact unit 5a is connected to a negative DC busbar 40 (or to an end having the same potential as the negative DC busbar 40). The other end of the switching contact unit 5a is connected to one end of the grounding resistance 28 (the grounding-side end). One end of the switching contact unit 5b is connected to the midpoint of the filter capacitors 16a and 16b (or to the other end of the grounding resistance 28). The other end of the switching contact unit 5b is connected to a connection end between the overvoltage suppression thyristor 26a and the overvoltage suppression resistance 26b in the overvoltage suppression circuit 26.

With the above connections, when the EGS 4 is manually controlled to simultaneously close the respective contacts of the switching contact units 5a and 5b, the negative DC busbar 40 and one end of the grounding resistance 28 (the grounding-side end) are electrically connected therebetween. With this operation, the positive electrode and the negative electrode of the filter capacitor 16a that is a first filter capacitor are electrically connected through the grounding resistance 28. Electric charge stored in the filter capacitor 16a is immediately discharged. When the contact of the switching contact unit 5b is closed, the midpoint of the filter capacitors 16a and 16b and the connection end between the overvoltage suppression thyristor 26a and the overvoltage suppression resistance 26b are electrically connected. With this operation, the positive electrode and the negative electrode of the filter capacitor 16b that is a second filter capacitor are electrically connected through the overvoltage suppression resistance 26b. Electric charge stored in the filter capacitor 16b is immediately discharged.

As described above, a particular control circuit for the discharge control is unnecessary also for the electric vehicle drive system according to the fourth embodiment. The purpose of the electric vehicle drive system according to the fourth embodiment can be achieved by configuring an EGS as at least a quadruple-pole single-throw switch instead of a conventional double-pole single-throw switch, by connecting the positive electrode and the negative electrode of the filter capacitor 16a that is the first filter capacitor to the switching contact unit 5a that is additionally provided to the EGS such that the positive electrode and the negative electrode of the filter capacitor 16a are electrically connected to both ends of the grounding resistance 28, and by connecting the positive electrode and the negative electrode of the filter capacitor 16b that is the second filter capacitor to the switching contact unit 5b that is additionally provided to the EGS such that the positive electrode and the negative electrode of the filter capacitor 16b are electrically connected to both ends of the overvoltage suppression resistance 26b.

As described above, in the electric vehicle drive system according to the fourth embodiment, two switching contact units are additionally provided to an EGS provided on a vehicle that is equipped with a pantograph, such that the positive electrode and the negative electrode of a first filter capacitor are electrically connected to a grounding resistance by a closing operation of one of the two switching contact units, and the positive electrode and the negative electrode of a second filter capacitor are electrically connected to an overvoltage suppression resistance by a closing operation of the other switching contact unit. Therefore, even when the electric vehicle is an AC electric vehicle, it is possible to obtain effects identical to those described in the first embodiment.

In the fourth embodiment, there has been explained the case as an example, in which a filter capacitor in a smoothing circuit unit is divided into the first and second filter capacitors. However, when the filter capacitor is configured as a single filter capacitor in which the midpoint of the first and second filter capacitors is not grounded, it suffices that only one switching contact unit is added to the EGS. In this case, it suffices that the positive electrode and the negative electrode of the single filter capacitor are connected to either the grounding resistance or the overvoltage suppression resistance.

Fifth Embodiment

Figure 6:
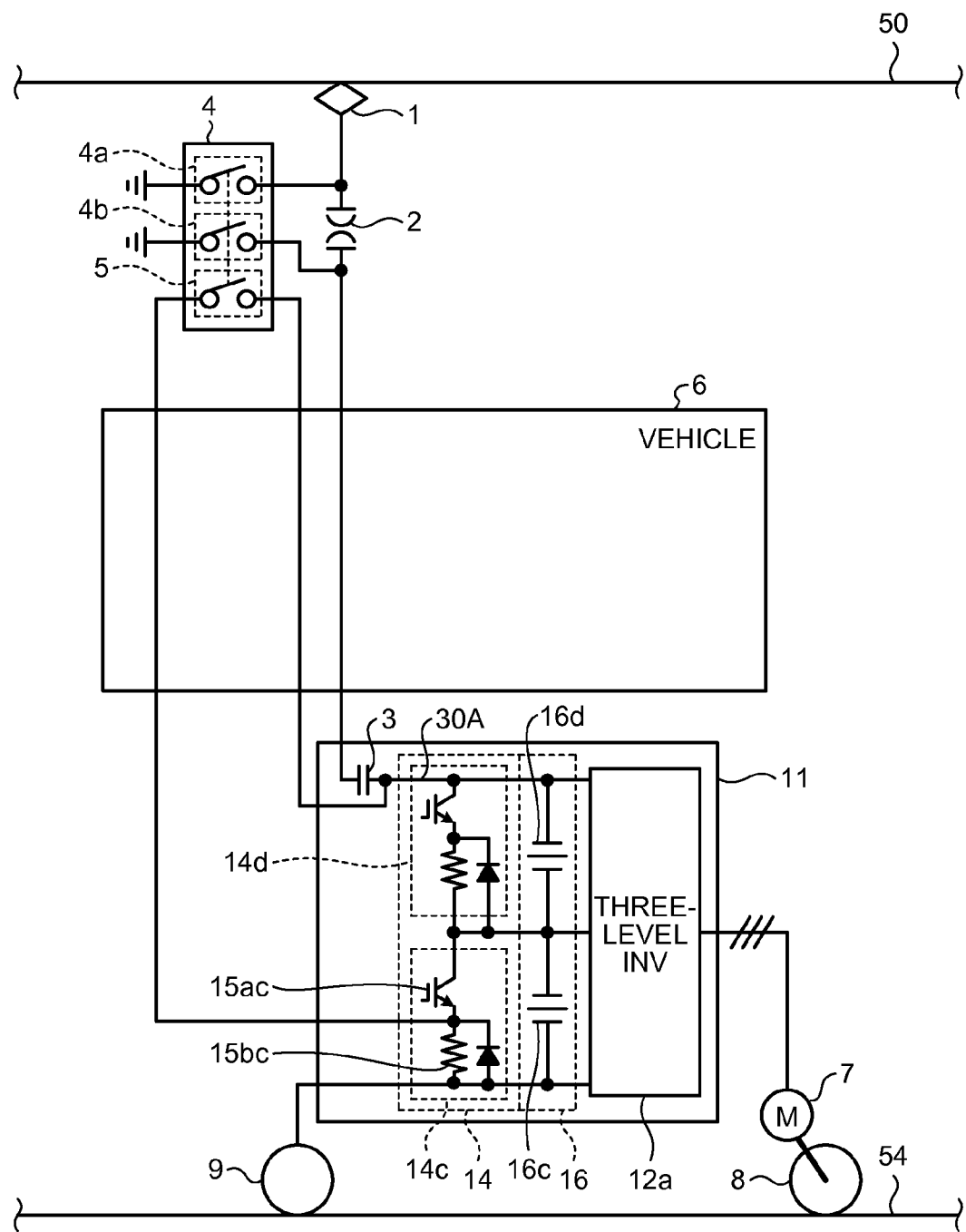
FIG. 6 depicts a configuration of main parts of an electric vehicle drive system according to a fifth embodiment.

In the first to fourth embodiments, there has been explained a case where the INV that drives an electric motor is a two-level INV. However, in a fifth embodiment, a case where the INV that drives an electric motor is a three-level INV is explained with reference to FIG. 6. FIG. 6 depicts a configuration of main parts of an electric vehicle drive system according to the fifth embodiment. In FIG. 6, constituent elements same or equivalent to those shown in FIG. 1 are denoted by like reference signs and redundant explanations thereof will be omitted.

In the fifth embodiment, as shown in FIG. 6, a three-level INV 12a is provided as a converter that drives the electric motor 7. With this configuration, in the smoothing circuit unit 16, filter capacitors 16c and 16d are connected in series to be connected between DC busbars. Further, with the configuration of the smoothing circuit unit 16, in the BCH circuit 14, BCH circuits 14c and 14d are connected in series to be connected between the DC busbars. Because operations of the three-level INV 12a are publicly known, explanations of the operations will be omitted.

In FIG. 6, the EGS 4 according to the fifth embodiment is configured as a triple-pole single-throw switch that includes the switching contact units 4a, 4b, and 5, similarly to the first embodiment. The connections of the switching contact units 4a and 4b are the same as those described in the first to fourth embodiments. On the other hand, one end of the switching contact unit 5 is connected to the positive DC busbar 30A (or to an end having the same potential as the positive DC busbar 30A). The other end of the switching contact unit 5 is connected to a connection end between a switching element 15ac and a brake resistance 15bc in the BCH circuit 14c on the low side.

With the above connections, when the EGS 4 is manually controlled to close the contact of the switching contact unit 5, the positive electrode and the negative electrode of the smoothing circuit unit 16 are electrically connected through the brake resistance 15bc. Therefore, electric charge stored in the filter capacitors 16c and 16d is immediately discharged.

As described above, a particular control circuit for the discharge control is unnecessary also for the electric vehicle drive system according to the fifth embodiment. The purpose of the electric vehicle drive system according to the fifth embodiment can be achieved by configuring an EGS as at least a triple-pole single-throw switch instead of a conventional double-pole single-throw switch, and by connecting the positive electrode and the negative electrode of the smoothing circuit unit 16 to the switching contact unit 5 that is additionally provided to the EGS such that the positive electrode and the negative electrode of the smoothing circuit unit 16 are electrically connected to both ends of the brake resistance 15bc.

As described above, in the electric vehicle drive system according to the fifth embodiment, one switching contact unit is additionally provided to an EGS provided on a vehicle that is equipped with a pantograph, such that the positive electrode and the negative electrode of a smoothing circuit unit are electrically connected to one of brake resistances by a closing operation of the switching contact unit. Therefore, even when a three-level INV is used instead of a two-level INV, it is possible to obtain effects identical to those described in the first embodiment.

INDUSTRIAL APPLICABILITY

As described above, the present invention is useful as an electric vehicle drive system that can simply and reliably discharge electric charge in a filter capacitor.

REFERENCE SIGNS LIST

1 Pantograph
2 High speed breaker (HB)
3 Line breaker (LB)
4 Earth ground switch (EGS)
4a, 4b, 5, 5A, 5B, 5a, 5b Switching contact unit
6, 6A, 6B Vehicle
7 Electric motor
8, 9 Wheel
11, 11A, 11B Electric-vehicle power conversion device
12 Inverter (INV)
12a Three-level inverter (three-level INV)
14, 14a to 14d, 14A, 14B Brake chopper circuit (BCH circuit)
15a, 15aa, 15ac, 15aA, 15aB Switching element
15b, 15ba, 15bc, 15bA, 15bB Brake resistance
16 Smoothing circuit unit
16a to 16d, 16aA, 16aB Filter capacitor
20 Transformer
21 Reactor
22 Charging circuit
22a Charging resistance
22b Contactor
26 Overvoltage suppression circuit
26a Overvoltage suppression thyristor
26b Overvoltage suppression resistance
28 Grounding resistance
30A, 30B Positive DC busbar
40 Negative DC busbar
50 Overhead wire
54 Rail

The invention claimed is:

1. An electric vehicle drive system comprising:
an electric-vehicle power conversion device that converts DC power or AC power supplied from an overhead wire into desired AC power to drive an electric motor as a load;
a first breaker that blocks an electric current flowing between the overhead wire and the electric-vehicle power conversion device; and
a grounding switch that grounds the first breaker,
wherein the electric-vehicle power conversion device includes a main circuit unit and a second breaker, where the main circuit unit includes at least a smoothing circuit unit that contains a filter capacitor that receives and stores therein power supplied from the overhead wire, and an inverter that converts a DC voltage from the smoothing circuit unit into an AC voltage to drive the electric motor as a load, and where the second breaker blocks a power supply path between the first breaker and the inverter,
wherein the grounding switch is configured as a single-throw switch that includes three or more pole switching contacts, and
wherein a predetermined resistor that is one of circuit elements that constitute the main circuit unit is connected to a switching contact of the grounding switch such that when the switching contact of the grounding switch is closed, the predetermined resistor is electrically connected between a positive electrode and a negative electrode of the filter capacitor.

2. The electric vehicle drive system according to claim 1, wherein the main circuit unit includes a brake chopper circuit that consumes excess power, which cannot be returned toward the overhead wire, when the electric motor operates as a power generator, and
wherein a brake resistance included in the brake chopper circuit is used as the predetermined resistor.

3. The electric vehicle drive system according to claim 2, wherein the brake chopper circuit includes a plurality of brake chopper circuits that are connected in parallel, and
wherein a brake resistance included in any one of the brake chopper circuits is used as the predetermined resistor.

4. The electric vehicle drive system according to claim 1, wherein the main circuit unit includes a charging circuit that controls charging of the filter capacitor, and
wherein a charging resistance included in the charging circuit is used as the predetermined resistor.

5. The electric vehicle drive system according to claim 1,
wherein the electric vehicle drive system is a drive system that operates upon reception of power supplied from an AC overhead wire through a transformer,
wherein the main circuit unit further includes a converter that converts an AC voltage reduced by the transformer into a DC voltage, and an overvoltage suppression circuit that suppresses an overvoltage of the smoothing circuit unit, and
wherein an overvoltage suppression resistance included in the overvoltage suppression circuit is used as the predetermined resistor.

6. The electric vehicle drive system according to claim 1,
wherein the electric vehicle drive system is a drive system that operates upon reception of power supplied from an AC overhead wire through a transformer,
wherein the main circuit unit is constituted by further including a converter that converts an AC voltage reduced by the transformer into a DC voltage, and a grounding resistance that grounds a midpoint between one filter capacitor and the other filter capacitor that constitute the smoothing circuit unit and are connected in series, and
wherein the grounding resistance is used as the predetermined resistor.

7. The electric vehicle drive system according to claim 1,
wherein the electric vehicle drive system is a drive system that operates upon reception of power supplied from an AC overhead wire through a transformer,
wherein the main circuit unit further includes a converter that converts an AC voltage reduced by the transformer into a DC voltage, an overvoltage suppression circuit that suppresses an overvoltage of the smoothing circuit unit, and a grounding resistance that grounds a midpoint between low-side and high-side filter capacitors that constitute the smoothing circuit unit and are connected in series, and
wherein the grounding resistance is used as one of the predetermined resistors to form a discharge circuit for the low-side filter capacitor, and an overvoltage suppression resistance included in the overvoltage suppression circuit is used as one of the predetermined resistors to form a discharge circuit for the high-side filter capacitor.

8. The electric vehicle drive system according to claim 1,
wherein the inverter in the main circuit unit is configured as a three-level inverter,
wherein the smoothing circuit unit in the main circuit unit includes low-side and high-side filter capacitors that are connected in series to be connected between DC busbars,
wherein the main circuit unit further includes brake chopper circuits that are connected in parallel respectively to the low-side and high-side filter capacitors on an input side of the three-level inverter, and
wherein a brake resistance included in a low-side filter capacitor is used as the predetermined resistor, and an end of the brake resistance, which is not connected to a negative DC busbar, and one end of a positive DC busbar are connected to the grounding switch to form a discharge circuit for the low-side and high-side filter capacitors.

* * * * *